Oct. 17, 1967  H. WILLRETT ET AL  3,348,196

PULSE SOURCE CONTROL CIRCUIT USING MAGNETIC COUNTERS
Filed Aug. 6, 1963

INVENTOR
HELMUT WILLRETT
ULRICH KUHL

BY *[signature]*

ATTORNEY 3,348,196
PULSE SOURCE CONTROL CIRCUIT USING MAGNETIC COUNTERS
Helmut Willrett, Ditzingen, Wurttemberg, and Ulrich Kuhl, Munchingen, Wurttemberg, Germany, assignors to International Standard Electric Corporation, a corporation of Delaware
Filed Aug. 6, 1963, Ser. No. 300,255
Claims priority, application Germany, Aug. 28, 1962, St 19,642
10 Claims. (Cl. 340—146.1)

This invention relates generally to an arrangement for supervising pulse sources, and more particularly to arrangements utilizing magnetic controls.

Telephone exchange systems use pulse sources to supervise centralized time devices or pulse timers, for example. Since these sources are centralized components which perform very important functions, several redundantly connected timing devices or timers are generally used. To provide such redundant connections, the prior art includes many devices for interconnecting the timers. Then, if a timer fails, it can automatically be replaced by a stand-by substitute circuit. In many cases, all units are in operation, and each individual unit can perform all necessary functions if required to do so.

Known supervising circuits for controlling pulse sources often include a timing circuit which is repeatedly charged by periodically arriving pulses. If the pulses fail to arrive for some time, the timing circuit is discharged to such an extent that a trouble signal is indicated. Responsive thereto, the circuit switches to an idle one of the redundant, stand-by devices.

Accordingly, an object of the invention is to provide new and improved pulse source control circuits. In this connection, an object is to provide difference-counting circuits for detecting differences between pulses from two sources and to transfer to a stand-by unit when the difference indicates trouble conditions. In particular, an object is to provide extremely reliable difference counters, thus insuring continuity of operations under marginal failure conditions. Here an object is to utilize reliable magnetic counters.

In keeping with one aspect of the invention, at least two equal pulse source devices are always provided for operation. The pulses from these two sources are led to a difference-counting device which releases a trouble signal upon the occurrence of a predetermined difference in a number of pulses from the two pulse sources. The difference counting device is periodically returned to a zero-position. The time intervals for the zero setting of the difference-counting device are designed to meet (1) the counting rate of the difference counting device and (2) the admissible deviations of the pulse sequences supervised. This periodic zero setting of the difference counting device prevents false trouble indicating signals responsive to an accumulation of admissible deviations of the pulses from the pulse sources.

A magnetic flux counter is used as a difference counting device. This counter has two magnetizing windings energized by the two pulse sources in different directions and controlled from the remanence point zero. In case of trouble, the magnetic flux counter is saturated in one or the other directions of magnetic saturation depending on which of the pulse sources failed. Trouble indication can be initiated in a known manner responsive to changes in the input resistance of the magnetic flux counter. The polarity of the saturation discriminates as to which of the pulse sources failed.

According to a further aspect of the invention, the difference counting device may consist of two magnetic flux counters which are normally magnetized with opposite polarities. The magnetic flux counters are operated through pulse shaping stages, fed from the pulse sources. An indicator, associated with each magnetic flux counter, responds when the counting core reaches a magnetic saturation in a polarity opposite to the polarity of the normal or original condition. A distinct fault or failure indication is thus created for each pulse source. The two magnetic flux counters are coupled so that the operation of the counting circuits is blocked if pulses appear via both sources simultaneously. If more than two pulse sources are supervised, sources are combined in pairs, each pair controlling one difference counting device. The resetting circuits of all difference counting devices are supplied from a common supervising circuit.

The above mentioned and other features of this invention and the manner of obtaining them will become more apparent, and the invention itself will be best understood by reference to the following description of an embodiment of the invention taken in conjunction with the accompanying drawings, in which.

Figure 1:
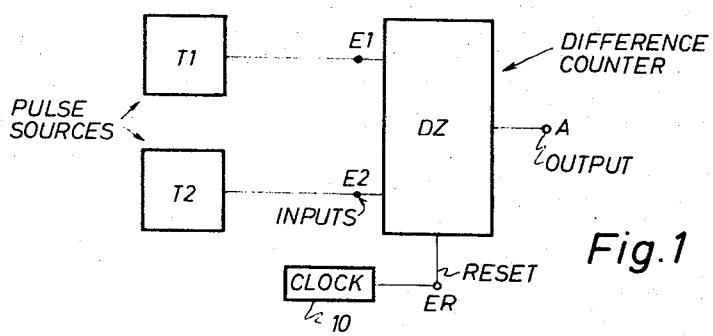
FIG. 1 shows a block diagram of a supervising arrangement constructed according to the invention.

FIG. 1 shows two pulse sources T1 and T2 which may take any well known form. Each source is connected to control an individual one of the inputs E1 and E2 of a difference counting device DZ. The counter is bi-directional in that it counts up responsive to pulses appearing at input E1 and down responsive to pulses at E2. Thus, the counter normally remains at a zero position. If the difference between the pulses arriving through the inputs E1 and E2 exceeds a certain value, the difference counter departs from zero, and a failure signal is released through the output A of the counting device DZ. By means of a separate input ER, the difference counting device DZ is periodically reset to its original or zero position. For example, in its simplest form, this reset could be under the control of a clock-like device 10. Thus, if a non-faulty difference accrues over a period of time, due to a deviation of the pulse sequences of both pulse sources T1 and T2, there is no effect because the counting device DZ is reset to zero position. On the other hand, if greater than a certain error occurs, the difference between the faults accumulate and an error signal is given.

Figure 2:
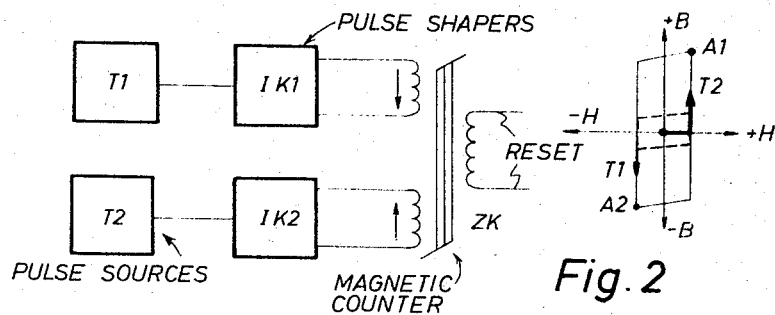
FIG. 2 is a block diagram and hysteresis loop which show and explain a magnetic flux counter.

FIG. 2 shows a magnetic flux counter which functions as a difference counting device. The pulses of the sources T1 and T2 are fed into two pulse shaping stages IK1 and IK2. Thus, each time that the sources T1, T2 produce a pulse, the counting core ZK receives a pulse with a standard time/voltage integral.

To avoid a mutual influence between the pulses reaching the counting core ZK, both control circutis IK1, IK2 are coupled so that their paths are mutually blocked. For example, this can be achieved when the output signal of the pulse shaping stage IK1 blocks the pulse shaping stage IK2 and vice versa.

As the hysteresis loop diagram on the right of FIG. 2 demonstrates, the counting core ZK is magnetized in one or the other direction depending upon whether it is energized from pulse source T1 or T2. Normally, this magnetization starts at the remanence or zero point. If the timing sequences are equal, core flux passes through the loop shown in dotted lines. That is, source T1 drives core flux toward negative saturation and source T2 drives core flux back toward positive saturation so that the net effect is zero. If, for example, the pulses source T1 fails, the pulses from source T2 magnetize the magnetic core ZK up to the saturation point A1. An indicator, showing when the saturation point is reached, is power fed from one winding of the counting core in a known way.

If the timing sequences of both sources T1, T2 deviate from each other only within an admissible range, the operational diagrammatic loop fluctuates from one saturation point to the other in a number of discrete steps. To prevent the release of failure signal in such a case, the zero remanence in the magnetic core ZK is reset periodically. Thereupon, the loop is again as shown on the diagram, on the right of FIG. 2. The counting core is reset in one or the other direction through incorporated reset windings.

Figure 3:
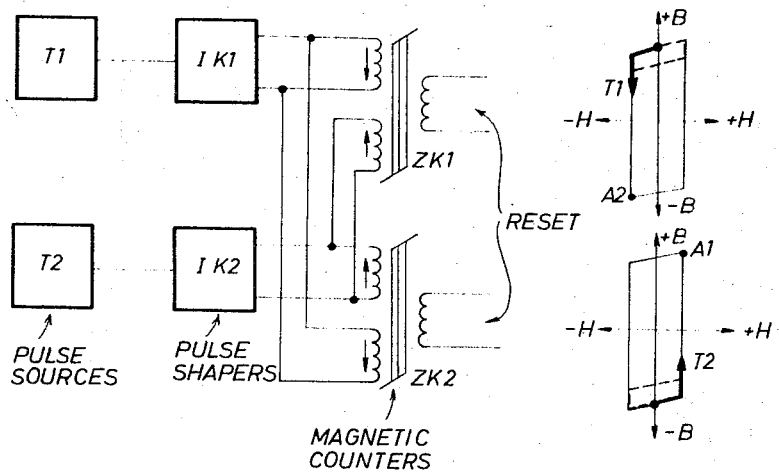
FIG. 3 is a block diagram and hysteresis loop which show and explain two magnetic flux counters for the difference counting device.

To obtain clearly arranged circuits, and particularly to simplify resetting, two magnetic flux counters ZK1 and ZK2 are used as shown in FIG. 3. Both magnetic cores are magnetized by the pulses of both pulse shaping stages IK1 and IK2. But the magnetic effects of the two shapers have opposite polarity.

The original condition of both counting cores differs too. Initially, they are at the remanence points +B and −B. Only the resetting impulse needs to be polarized differently. If the timing pulse of the pulse source T1 fails, the magnetic flux of the counting core ZK2 is driven to the saturation point A1 through the pulses of pulse source T2. The indicator for the counting core ZK2 releases an alarm referred to the pulse source T1. If, however, the pulse source T2 fails the flux of counting core ZK1 is driven to the saturation point A2 responsive to the pulses of the pulse source T1. An alarm circuit associated to the source T2 is energized by the indicator of the counting core ZK1. The counting cores not participating in the indication (in the first case mentioned ZK1 and in the second case ZK2) remain at these faulty conditions in their originating position +B or −B, respectively. Both control circuits can be coupled as shown in FIG. 2.

Another magnetic flux counting circuit with a larger counting rate can be provided to reset the two counting cores ZK1 and ZK2. The reset circuit furnishes the resetting pulses when it reaches its final position. Also, the reset circuit returns again into its originating position when its reset pulse is produced. This counting circuit will be controlled by either of the two supervised pulse sources T1 or T2. The counting rate of this third counting circuit is adapted to the admissible tolerance of the timing sequences of both pulse sources and to the counting rate of the difference counting device. The difference counting device should not be restored to zero if a source has failed and if fault indication was forwarded.

While the principles of the invention have been described above in connection with specific apparatus and applications, it is to be understood that this description is made only by way of example and not as a limitation on the scope of the invention.

We claim:

1. A supervision control circuit for detecting the failure of pulse sources comprising a plurality of pulse sources, difference counting means comprising a circuit energized individually and alternately from said sources for detecting a predetermined difference in the output of said sources, said predetermined difference resulting from a failure of one of said sources, means responsive to the detection of said failure difference for providing an output fault signal, and means for periodically resetting said difference counter before a cumulative long term drift type of non-fault difference reaches the level of said predetermined fault difference.

2. The circuit of claim 1 and means for matching said reset to admissible deviations of said pulse sources and the counting rates of said difference counting means.

3. The circuit of claim 1 wherein said difference counting means comprises a bi-directional counter which normally remains at zero if coordinated pulses are received from said sources.

4. The circuit of claim 1 wherein said difference counting means comprise a magnetic counting device having a plurality of input windings, means for energizing of said windings by pulses from one of said sources to drive core flux a step in one magnetic direction and means for energizing the other of said windings by pulses from another of said sources to drive core flux a step in an opposite magnetic direction.

5. The circuit of claim 4 and means for periodically resetting said core to zero remanence.

6. The circuit of claim 5 wherein said input windings and said pulses are so inter-related to drive said core flux to saturation only after the receipt of a predetermined number of uncoordinated difference pulses from said sources.

7. The circuit of claim 6 and means responsive to said saturation for sending an error signal.

8. The circuit of claim 7 and means for indicating the faulty pulse source responsive to the polarity of said saturation.

9. The circuit of claim 1 wherein said difference counting means comprises a pair of magnetic devices.

10. The circuit of claim 1 wherein said difference counting means comprises at least one magnetic device, and pulse shaping means interposed between each of said sources and said magnetic device for providing drive pulses, each having a uniform volt second content, responsive to each out from said pulse sources.

References Cited

UNITED STATES PATENTS 2,818,556  12/1957  Lo _____ 340—174
2,968,796  1/1961   Lane et al. _____ 340—174

OTHER REFERENCES

Pages 227 to 233, April 1962, Leslie, A Fast Counter for Adding or Subtracting Randomly Related Pulse Trains, Electronic Engineering.

MALCOLM A. MORRISON, *Primary Examiner.*

M. P. HARTMAN, *Assistant Examiner.*